(12) United States Patent
Buendgen et al.

(10) Patent No.: US 11,533,174 B2
(45) Date of Patent: Dec. 20, 2022

(54) BINDING SECURE OBJECTS OF A SECURITY MODULE TO A SECURE GUEST

(71) Applicant: INTERNATIONAL BUSINESS MACHINES CORPORATION, Armonk, NY (US)

(72) Inventors: Reinhard Theodor Buendgen, Tuebingen (DE); Richard Victor Kisley, Charlotte, NC (US); Volker Urban, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 451 days.

(21) Appl. No.: 16/775,851

(22) Filed: Jan. 29, 2020

(65) Prior Publication Data
US 2021/0234681 A1    Jul. 29, 2021

(51) Int. Cl.
*H04L 9/08* (2006.01)
*G06F 9/455* (2018.01)
(Continued)

(52) U.S. Cl.
CPC ........ *H04L 9/0877* (2013.01); *G06F 9/45558* (2013.01); *G06F 21/57* (2013.01); *G06F 21/602* (2013.01); *G06F 2009/45595* (2013.01)

(58) Field of Classification Search
None
See application file for complete search history.

(56) References Cited

U.S. PATENT DOCUMENTS

| 4,494,189 A | 1/1985 | Bean et al. |
| 5,535,416 A | 7/1996 | Feeney et al. |
| (Continued) | | |

FOREIGN PATENT DOCUMENTS

| CN | 101044489 A | 9/2007 |
| CN | 103368973 A | 10/2013 |
| (Continued) | | |

OTHER PUBLICATIONS

Fisher-Ogden, John, "Hardware Support for Efficient Virtualization," University of California, San Diego, Tech. Rep. 12, 2006 (No further date information available), pp. 1-12.
(Continued)

*Primary Examiner* — William J. Goodchild
(74) *Attorney, Agent, or Firm* — Edward J. Wixted, III, Esq.; Blanche E. Schiller, Esq.; Heslin Rothenberg Farley & Mesiti P.C.

(57) ABSTRACT

At least one secure object of a security module is bound to a secure guest. A trusted component determines whether metadata of the secure guest includes a confidential binding attribute for the security module. Based on determining that the metadata includes the confidential binding attribute, the trusted component configures the security module for the secure guest in a select mode. The select mode prevents certain operations from being intercepted by a hypervisor associated with the secure guest. The trusted component intercepts a security module communication and performs a cryptographic operation on one or more secure objects of the security module communication using the confidential binding attribute to provide a cryptographic result. An outcome of the security module communication, which includes the cryptographic result, is provided to a receiver.

25 Claims, 9 Drawing Sheets

(51) Int. Cl.
*G06F 21/57* (2013.01)
*G06F 21/60* (2013.01)

(56) References Cited

U.S. PATENT DOCUMENTS

| | | |
|---|---|---|
| 6,453,392 B1 | 9/2002 | Flynn, Jr. et al. |
| 7,143,287 B2 | 11/2006 | Bade et al. |
| 7,639,819 B2 | 12/2009 | Ho et al. |
| 8,826,039 B2 | 9/2014 | Chou et al. |
| 9,578,017 B2 | 2/2017 | Ferguson et al. |
| 9,720,721 B2 | 8/2017 | Bacher et al. |
| 9,767,293 B2 | 9/2017 | Boenisch et al. |
| 9,836,308 B2 | 12/2017 | Boenisch et al. |
| 9,928,080 B2 | 3/2018 | Boenisch et al. |
| 10,284,534 B1 | 5/2019 | Perlman et al. |
| 2009/0110191 A1 | 4/2009 | Sanvido et al. |
| 2011/0246785 A1 | 10/2011 | Linsley et al. |
| 2012/0179909 A1 | 7/2012 | Sagi et al. |
| 2018/0332011 A1 | 11/2018 | Gray |

FOREIGN PATENT DOCUMENTS

| | | | |
|---|---|---|---|
| CN | 103701607 A | 4/2014 | |
| WO | WO-2011156261 A1 * | 12/2011 | ............ G06F 21/575 |
| WO | WO2011156261 A1 | 12/2011 | |
| WO | WO2018218349 A1 | 12/2018 | |

OTHER PUBLICATIONS

Gum, P.H., "System/370 Extended Architecture: Facilities for Virtual Machines," IBM J. Res. Develop., vol. 27, No. 6, Nov. 1983, pp. 530-544.
Hughes, James et al., "Transparent Multi-core Cryptographic Support on Niagara CMT Processors," Second International Workshop on Multicore Software Engineering, May 2009, pp. 1-8.
IBM, "z/Architecture—Principles of Operation," IBM Publication No. SA22-7832-11, Twelfth Edition, Sep. 2017, pp. 1-1902.
Klimm, Alexander et al., "An Adaptive and Scalable Multiprocessor System For Xilinx FPGAs Using Minimal Sized Processor Cores," 2008 IEEE International Symposium on Parallel and Distributed Processing, Apr. 2008, pp. 1-7.
Lal, Shankar et al., "Securing VNF Communication in NFVI," 2017 IEEE Conference on Standards for Communications and Networking (CSCN), Sep. 2017, pp. 187-192.
Le Vinh, Thinh et al., "Trusted Platforms to Secure Mobile Cloud Computing," 2014 IEEE International Conference on High Performance Computing and Commumcations, 2014 IEEE 6th International Symposirum on Cyberspace Safety and Security, 2014 IEEE 11th International.
Mell, Peter and Tim Grance, "The NIST Definition of Cloud Computing," National Institute of Standards and Technology, Information Technology Laboratory, Special Publication 800-145, Sep. 2011, pp. 1-7.
International Search Report and Written Opinion, PCT/IB2020/061733, dated Mar. 23, 2021, pp. 1-8.

* cited by examiner

BINDING SECURE OBJECTS OF A SECURITY MODULE TO A SECURE GUEST

BACKGROUND

One or more aspects relate, in general, to processing within a computing environment, and in particular, to protecting data within such an environment.

In computing environments, cryptographic elements are useful technological components in protecting data. Information may be stored or transmitted in a cryptographically secured form in order to avoid unauthorized access to the information stored or transmitted. In some cases, software-based techniques may be used to perform such data protection; in other cases, hardware support and security specific elements may be used. These specific elements may be named hardware security modules (HSMs) which may be used as part of a computer or an information transmission system of a computing environment.

A hardware security module may include specific circuitries to provide functions for data encryption and data decryption. The functions may also include generating and storing cryptographic keys for use of guest systems, also referred to as guests. Various guests (e.g., virtual machines, virtual servers, etc.) are controlled by a hypervisor or virtual machine manager. Different guests managed by a common hypervisor can be generated by different owners. A traditional hypervisor has full control over the guests it hosts. In particular, the hypervisor has the capability to inspect and even modify memory of the hosted guest. In a cloud environment, the hypervisor and its administrators are to be fully trustworthy.

Some guests managed by a hypervisor are secure guests. A secure guest is a guest that can be hosted by one or more hypervisors that are not fully trustworthy. The image of such a guest would be protected when loaded and the protection of the contents of the resources assigned to the guest (e.g., memory, central processing unit (CPU) registers, etc.) would be maintained throughout the lifetime of the guest. The protection of the guest includes at least integrity protection (e.g., hypervisor cannot maliciously change any guest states) and in addition can include maintaining the confidentiality of the initial image, code and data running in the guest. Examples of environments that support secure guests include AMD SEV (Advanced Micro Devices Secure Encrypted Virtualization) and POWER® protected computation. POWER is a trademark or registered trademark of International Business Machines Corporation in at least one jurisdiction.

SUMMARY

Shortcomings of the prior art are overcome and additional advantages are provided through the provision of a computer program product for facilitating processing within a computing environment. The computer program product includes at least one computer readable storage medium readable by at least one processing circuit and storing instructions for performing a method. The method includes binding at least one secure object of a security module of the computing environment to a secure guest of the computing environment. The secure guest is configured to use the security module. The binding includes determining, by a trusted component of the computing environment, whether metadata of the secure guest includes a confidential binding attribute for the security module. Based on determining that the metadata includes the confidential binding attribute, the trusted component configures the security module for the secure guest in a select mode. The select mode prevents certain operations from being intercepted by a hypervisor associated with the secure guest. The trusted component intercepts a security module communication. A cryptographic operation is performed on one or more secure objects of the security module communication using the confidential binding attribute to provide a cryptographic result. An outcome of the security module communication is provided to a receiver. The outcome includes the cryptographic result.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to bind secure objects of a security module of a computing environment to a secure guest of the computing environment. A secure object includes, for instance, a confidential attribute (also referred to as a secret), such as a key or material to derive a key; additional information, such as one or more attributes of the object; and/or integrity protection data that ensures that the additional information is not separated from the secure object. One or more parts of the secure object may overlap. The confidential attribute, in one embodiment, is wrapped by a select key, such as a master key or another provided key (e.g., a guest key) of the security module. Configuration of the security module includes securely storing the select key in a memory of the security module. Data can be received by the security module in an unencrypted form and can be encrypted on the security module, or vice versa. The encryption and/or decryption operations can be performed in hardware or software, or any combination thereof, on the security module. In one example, the security module is a hardware security module (HSM), which is, for instance, a pluggable component or an individually connected component to a computer system. In one particular example, the hardware security module is a cryptographic card; however, other examples exist.

One embodiment of a computing environment to incorporate and use one or more aspects of the present invention is described with reference to FIG. 1A. In one example, the computing environment is based on the z/Architecture hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety. IBM and z/Architecture are registered trademarks or trademarks of International Business Machines Corporation in at least one jurisdiction.

The computing environment may also be based on other architectures; the z/Architecture hardware architecture is only one example.

Figure 1A:
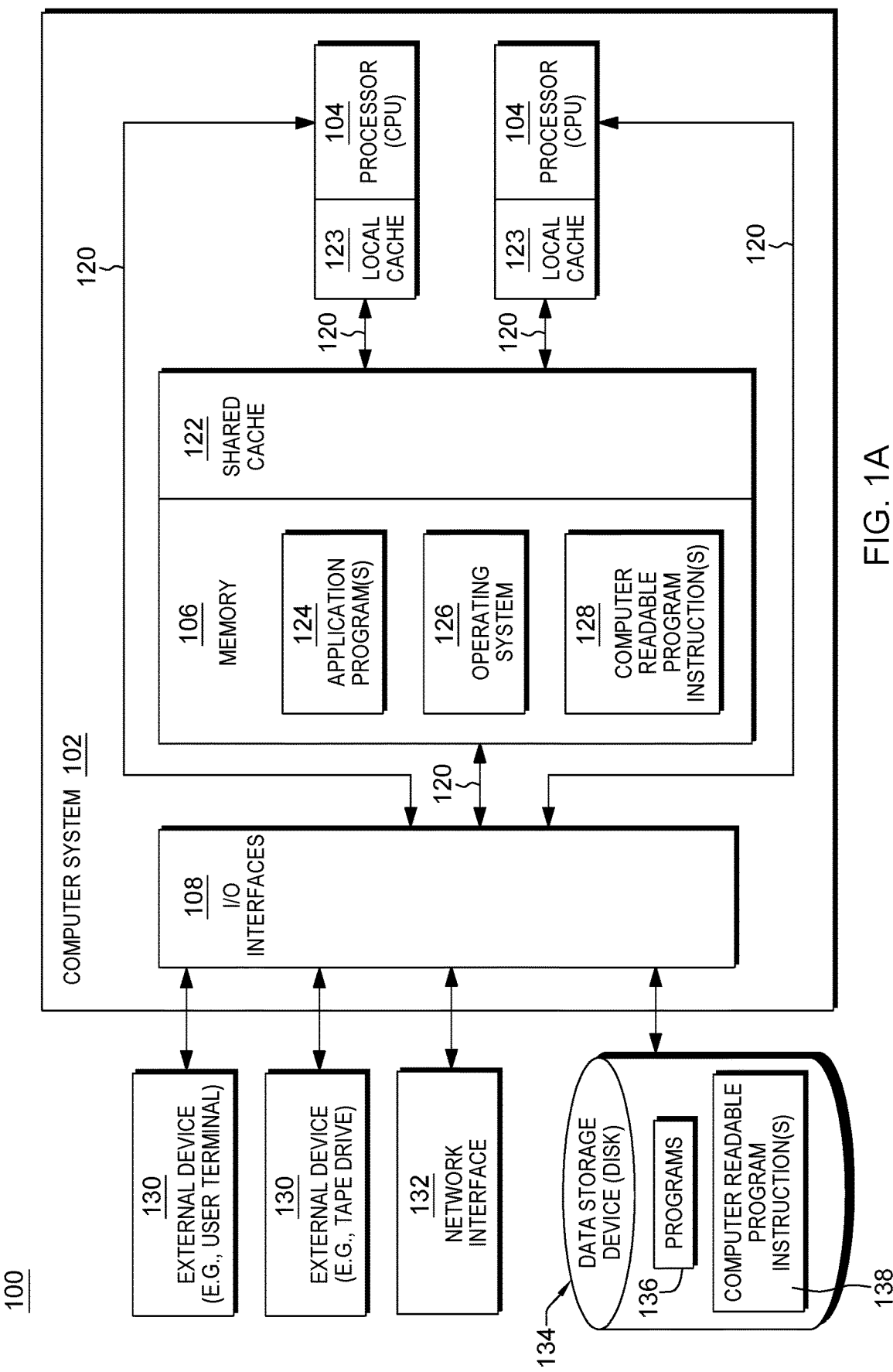
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache, such as a shared cache 122, which may be coupled to local caches 123 of processors 104. Further, memory 106 may include one or more programs or applications 124, an operating system 126, and one or more computer readable program instructions 128. Computer readable program instructions 128 may be configured to carry out functions of embodiments of aspects of the invention.

Computer system 102 may also communicate via, e.g., I/O interfaces 108 with one or more external devices 130, one or more network interfaces 132, and/or one or more data storage devices 134. Example external devices include a user terminal, a tape drive, a pointing device, a display, etc. Network interface 132 enables computer system 102 to communicate with one or more networks, such as a local area network (LAN), a general wide area network (WAN), and/or a public network (e.g., the Internet), providing communication with other computing devices or systems.

Data storage device 134 may store one or more programs 136, one or more computer readable program instructions 138, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
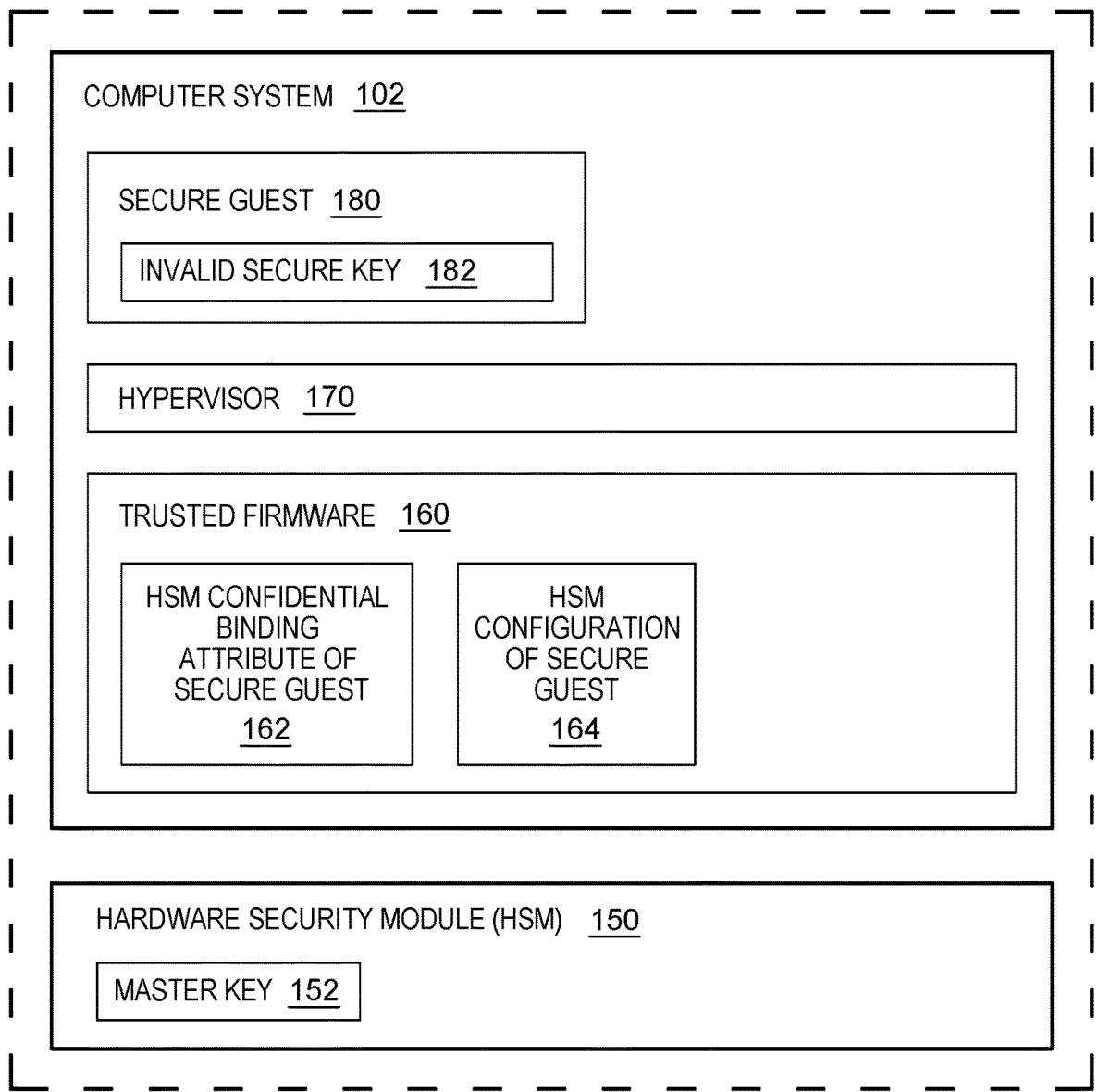
FIG. 1B depicts further details of the computing environment of FIG. 1A, in accordance with one or more aspects of the present invention.

Further details of one embodiment of a computing environment (e.g., computing environment 100) to incorporate and/or use one or more aspects of the present invention are described with reference to FIG. 1B. In one example, computing environment 100 is a shared computing environment that includes a system, such as computer system 102, and a security module, such as a hardware security module (HSM) 150, that includes one or more select keys (e.g., master key 152). In the examples herein, the security module is a hardware security module; however, in other embodiments, other security modules may be used.

Computer system 102 includes, in one example, a trusted component, such as trusted firmware 160, and a hypervisor 170 that interacts with one or more guests (e.g., virtual machines (VMs)), including one or more secure guests 180. One example of hypervisor 170 is the z/VM hypervisor, offered by International Business Machines Corporation, Armonk, N.Y. z/VM is a registered trademark or trademark of International Business Machines Corporation in at least one jurisdiction. The hypervisor is sometimes referred to as a host. The hypervisor manages guests executing within the computer system.

A guest or guest system is, for instance, an operating system executing in a virtual machine (VM) on a hypervisor. The hypervisor is used to assign one or more hardware security modules (e.g., hardware security module 150) to the guest system. A specific hardware security module (e.g., hardware security module 150) assigned to the guest may be configured with a cryptographic master key (e.g., master key 152; a.k.a., wrapping-key) used to wrap a key of the guest to provide a secure key for the guest.

One or more of the guests are considered secure guests. A secure guest is a guest whose state and memory are protected from hypervisor access. A secure guest is started using e.g., metadata that is transmitted to the trusted component (e.g., trusted firmware 160) in a confidentiality protecting and integrity protecting manner and which includes a confidential binding attribute (e.g., HSM confidential binding attribute 162).

In accordance with an aspect of the present invention, a secure key of a secure guest, such as secure guest 180, is considered an invalid (a.k.a., corrupted) secure key 182. It is corrupted such that it is not usable if taken by another component, including another guest. In one aspect, the secure key is part of a secure object, and the secure object of a particular guest is bound to a particular security module, as described herein. As used herein the binding of a secure object includes binding at least a portion of the secure object to the particular guest and the particular security module.

Trusted firmware 160 includes, for instance, a confidential binding attribute (a.k.a., a binding secret, e.g., a binding key or material to derive a binding key), such as an HSM confidential binding attribute of a secure guest 162 used to perform HSM binding of a secure object generated by a security module (e.g., HSM 150) to a secure guest (e.g., secure guest 180). In one example, HSM confidential binding attribute 162 is passed to the trusted component (e.g., trusted firmware 160) via metadata of the secure guest.

Trusted firmware 160 also includes, in one example, a control block 164 describing the HSM configuration of a secure guest (e.g., secure guest 180). A hardware security module listed in this configuration is configured to the secure guest in hypervisor pass-through mode, such that cryptographic operations issued by a guest are not intercepted by a hypervisor (e.g., hypervisor 170). Instead, they are intercepted by a trusted component (e.g., trusted firmware 160). As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one embodiment, a hardware security module (e.g., hardware security module 150) includes at least one master key 152 or other select key, which is not accessible to unauthorized parties. This master key is used to encrypt (i.e., wrap) keys available to the users of the hardware security module. The term 'master key' can denote an encryption/decryption key being stored on the HSM. In one embodiment, the master key is not transferred out of the hardware security module it is stored on. Keys wrapped by an HSM master key are called secure keys.

Hardware security modules exist that support secure objects (also referred to as secure key objects) with integrity protection. In one example, a secure object contains, for instance, an effective key encrypted by the master key of the hardware security module. In addition, in one example, it contains data that can be used by the hardware security module to verify that the secure object was created by the hardware security module with the current master key. This integrity protection is generated by the hardware security module because it depends on the master key. An example of such an integrity protected secure object is a secure key object of, e.g., the Crypto Express Adapters in EP11 mode, which includes a key wrapped by the master key on to which a message authentication code (MAC) of that wrapped key is concatenated. The MAC is computed, for instance, using a key derived from the master key.

Hardware security modules (e.g., hardware security module 150) are tamper-proof and protect confidential attribute(s) (e.g., key(s) of a secure guest) against unauthorized access (e.g., unscheduled physical plugging, physical infiltration, etc.). A hardware security module can be assigned to various virtual resources, such as virtual machines (VMs) and in a virtual environment, the hardware security module may not be aware of its reassignment from one virtual machine or guest to another virtual machine or guest.

The flexibility of VM assignments can pose security issues. In highly sensitive hosted information technology (IT) environments, owners of hosted guests (e.g., secure guests) wish to ensure that their secure keys (e.g., being wrapped by the master key of their HSM) cannot be used by untrusted guests they do not own, even if the guests are hacked or otherwise compromised and/or the secure key and/or other data is taken.

Figure 2:
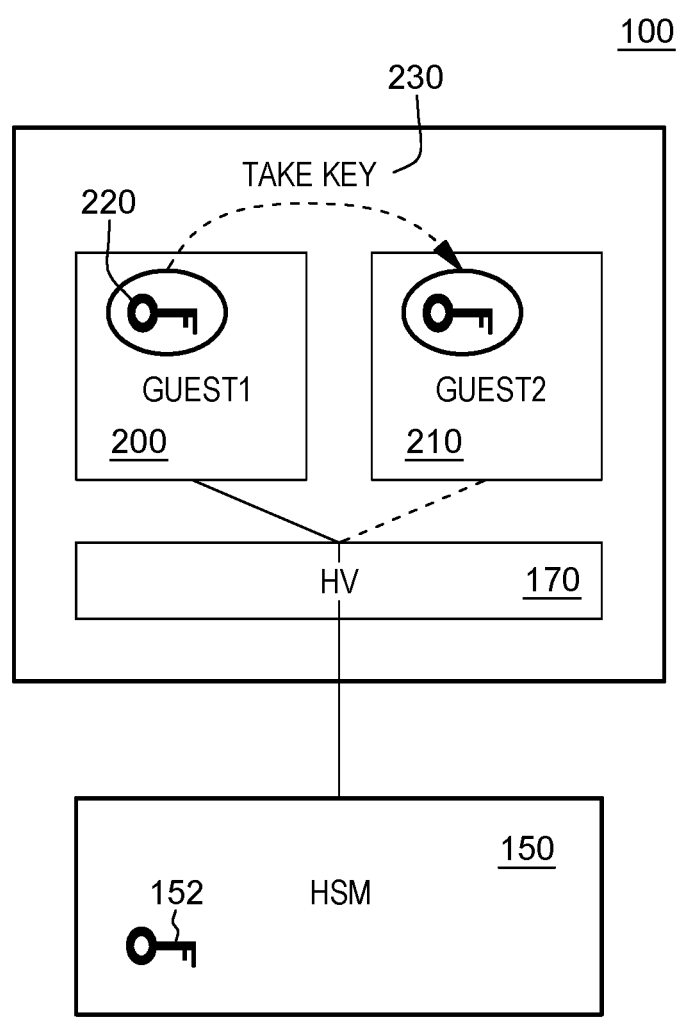
FIG. 2 depicts one example of potential security issues experienced with certain approaches utilizing a hardware security module.

FIG. 2 illustrates one example of such a security issue. As illustrated in FIG. 2, in one example, a hardware security module (HSM), such as hardware security module 150, contains a master key, such as master key 152, that is inaccessible to unauthorized parties. Master key 152 is utilized by program code of the hardware security module to encrypt (i.e., wrap) keys that the program code of the hardware security module makes available to the users of the hardware security module. The keys wrapped by hardware security module master key 152 are called secure keys.

In one example, a guest 200, guest1, is in possession of a secure key 220, which a hypervisor, e.g., hypervisor (HV) 170, provided to guest 200, from hardware security module 150. As indicated herein, hardware security modules are tamper-proof and protect confidential attributes (e.g., secrets, such as keys) against unauthorized access (e.g., unscheduled physical plugging, physical infiltration, etc.); however, guest 200 does not have comparable security, and therefore, can represent a vulnerability. In a virtual environment, because hypervisor 170 controls the assignment of resources, like a hardware security module to its guests, hardware security module 150 may not be aware of its reassignment from one guest (i.e., VM) to another guest (i.e., VM). Thus, there exists a security vulnerability if a malicious user hacks a given guest 200, guest1, utilizing a second guest 210, guest2, and the secure key 220 assigned to guest 200 is retained by second guest 210. Thus, second guest 210 can take (230) secure key 220 of guest 200. If the hypervisor (e.g., hypervisor 170) assigns hardware security module 150 to guest2 210, guest2 is able to use secure key 220.

The above taking of the key is particularly an issue in highly sensitive hosted IT environments, where the owner of hosted guests wishes to maintain security that is more aggressive than the administrators of the host environment. In a shared computing environment (e.g., shared computing environment 100), various guests can be owned by different entities, and hardware security module 150 can belong to only certain of those entities. Thus, a guest owner, such as the owner of guest 200 to which a secure key (e.g., secure key 220) was assigned, desires to maintain its secure key 220, which is wrapped by master key 152 of hardware security module 150. This guest owner does not want secure key 220 to be used by other guests (e.g., untrusted guests) that are owned by different entities who utilize resources in the shared computing environment. For instance, in FIG. 2, first guest 200 and second guest 210 have different owners and the owner of guest 200 wants to ensure that even if guest 200 is hacked, as illustrated in FIG. 2, and secure key 220 and/or other data is taken (230), it cannot be utilized by any owner other than the owner of guest 200 to which secure key 220 was originally assigned. This is addressed by one or more aspects of the present invention.

In accordance with one or more aspects of the present invention, a secure guest does not have access to a valid secure object (e.g., including a secure key) usable outside of the running instance of the secure guest maintained by the trusted component. An invalid secure object is made usable with the hardware security module by the trusted component if it has access to the correct hardware security module confidential binding attribute.

In one aspect, the trusted component (e.g., trusted firmware 160) uses a hardware security module confidential binding attribute (e.g., confidential binding attribute 162, such as a key or material from which a key is derived) to bind one or more secure objects used by the secure guests with the appropriate hardware security module. For instance, the trusted component uses the confidential binding attribute to modify one or more integrity protection fields of the secure objects that the secure guest uses with the hardware security module. The integrity protection fields are used to cryptographically bind attributes of, e.g., the key, such as, for instance, a purpose of the key (e.g., signing, encryption, etc.) to the key value. When secure objects are sent from the hardware security module to the secure guest, the trusted firmware uses the confidential binding attribute to encrypt or otherwise change one or more of the integrity protection fields of the secure object so that the secure guest receives a secure object that is bound to its instance run by the trusted component. When the secure guest sends the modified secure object back to the hardware security module for a new operation, the trusted component intercepts the operation and decrypts or otherwise removes the change to the integrity protection of the secure object, so that the hardware security module receives a secure object that it can use.

The trusted component maintains, for instance, a hardware security module confidential binding attribute (e.g., confidential binding attribute 162) for each hardware security module that a secure guest is allowed to access. The trusted component enforces that a secure guest can only access hardware security modules for which a hardware security module confidential binding attribute is contained in the guest's metadata. Further, the trusted component enforces, in one embodiment, that hardware security modules accessible to a secure guest are configured in hypervisor-passthrough mode, which means that a cryptographic operation (e.g., encryption/decryption) issued by a guest is not intercepted by the hypervisor. Instead, it bypasses the hypervisor and is intercepted by the trusted component, in one or more aspects.

In one embodiment, more than one security module may be configured to a guest, each with its own specific confidential binding attribute. Further, in one embodiment, the owner of a secure guest has an option to prepare one or more other secure guests with infrastructure containing the same confidential binding attribute as a first guest such that multiple guests owned by the same owner can exchange modified key objects. This allows another guest to take over computations in case a first guest fails, providing a high availability solution.

Figure 3:
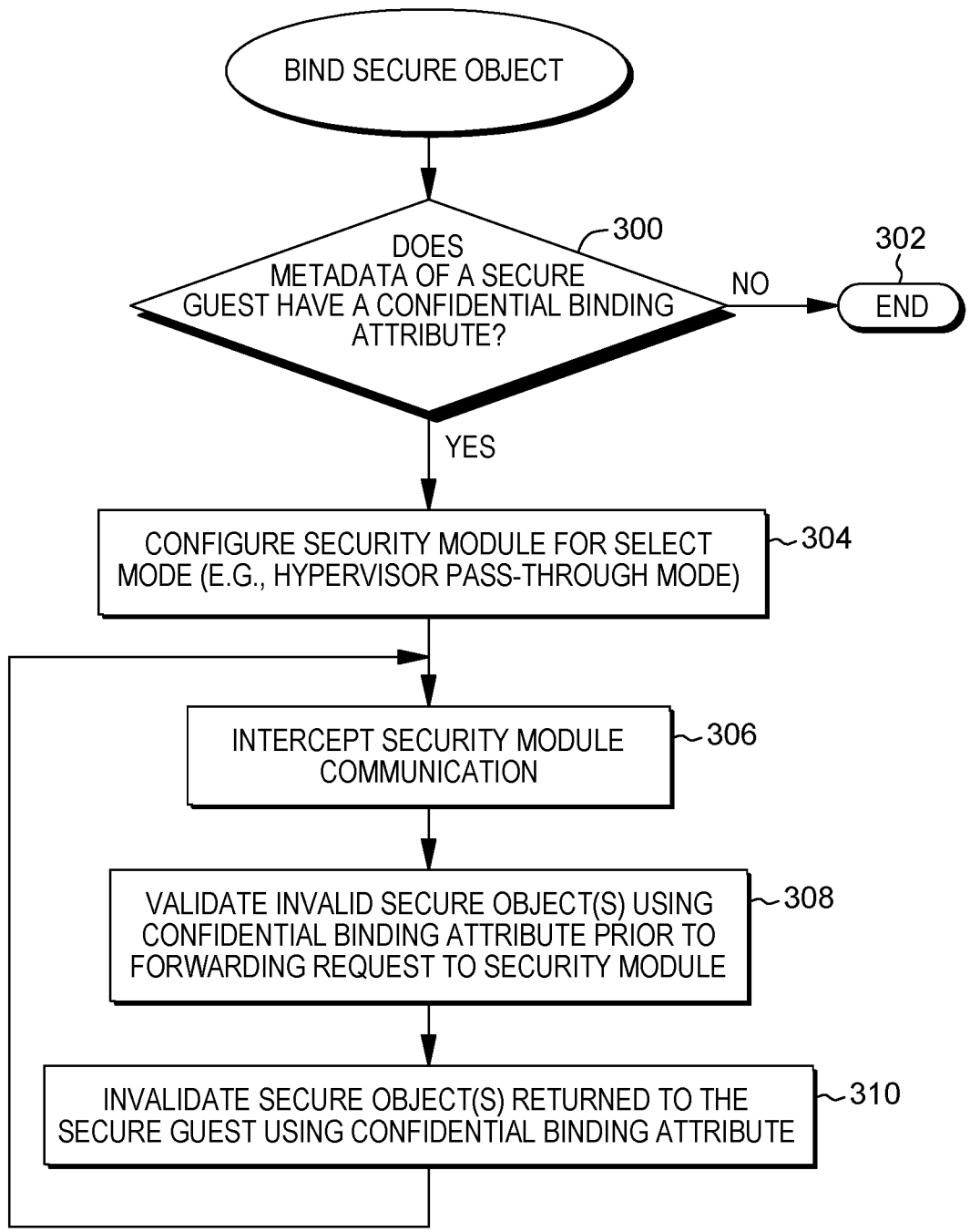
FIG. 3 depicts one embodiment of processing associated with binding secure objects of a security module to a secure guest, in accordance with one or more aspects.
Figure 4:
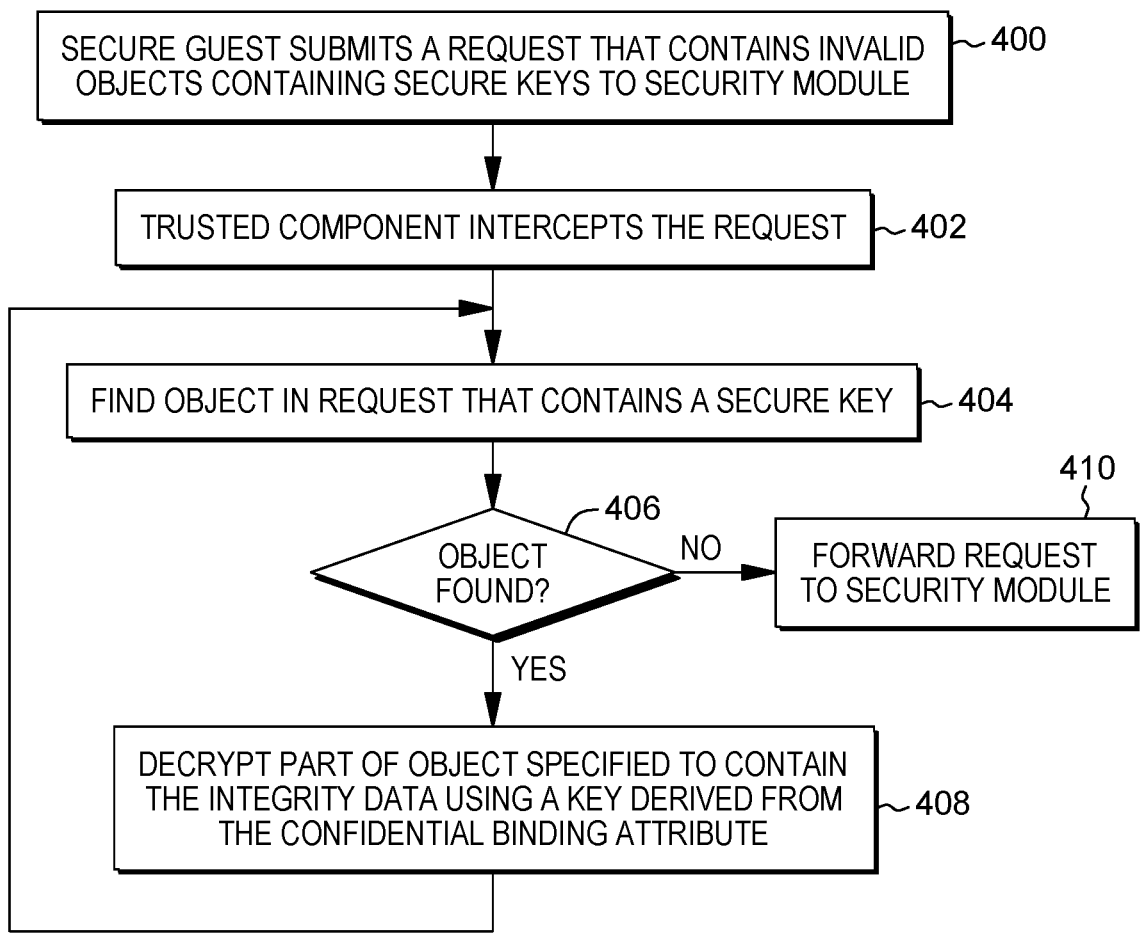
FIG. 4 depicts one example of a flow to forward a request to a security module, in accordance with one or more aspects.
Figure 5:
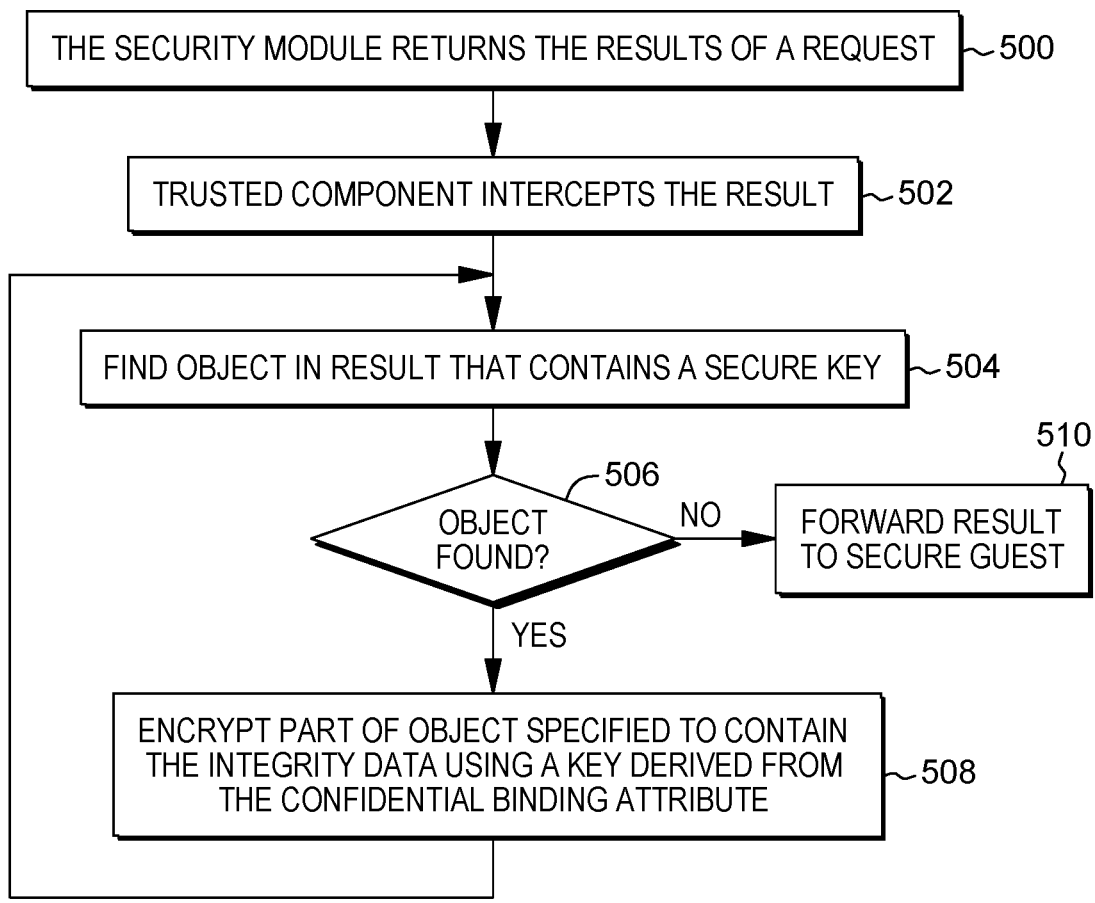
FIG. 5 depicts one example of a flow to return results of a request to a secure guest, in accordance with one or more aspects.

Further details regarding binding secure objects of a hardware security module to a secure guest are described with reference to FIGS. 3-5. In particular, FIG. 3 depicts one example of logic to bind a secure object of a security module (e.g., HSM 150) to a secure guest (e.g., secure guest 180); FIG. 4 depicts one example of logic for sending a request to a security module; and FIG. 5 depicts one example of logic for returning results of a request to a secure guest.

Initially, with reference to FIG. 3, one embodiment of binding a secure object of a security module (e.g., hardware security module 150) to a secure guest (e.g., secure guest 180) is described. In one embodiment, the binding is of a secure object of a secure guest configured to use a security module (e.g., hardware security module 150), and the binding is based on a confidential binding attribute (e.g., key) of the security module which is cryptographically linked to an image of the secure guest and which is securely provided to a trusted component (e.g., trusted firmware 160) as part of the installation of metadata of the secure guest provided to start an image of the secure guest.

A determination is made as to whether the metadata of a secure guest (e.g., secure guest 180) has a confidential binding attribute (e.g., confidential binding attribute 162), INQUIRY 300. If the metadata does not contain a confidential binding attribute, then this processing is complete, STEP 302. Otherwise, the processing continues in which a security module (e.g., hardware security module 150) is configured for a select mode, STEP 304. In one example, the trusted component (e.g., trusted firmware 160) configures the security module for hypervisor pass-through mode, in which a cryptographic operation issued by the guest is not intercepted by the hypervisor managing that guest. This configuration is performed in one example of the z/Architecture hardware architecture by configuring, e.g., a crypto control block of, e.g., a start interpretative execution (SIE) instruction of the z/Architecture hardware architecture. In one example, a trusted component (e.g., trusted firmware 160) verifies for each security module configured to the secure guest by the hypervisor whether a confidential binding attribute for that hardware security module exists and eliminates from the crypto control block each configuration of a security module for which no confidential binding attribute exists in the metadata of the secure guest and protects that crypto control block from being modified by the hypervisor during the lifetime of the secure guest.

Further, in one embodiment, the trusted component intercepts one or more security module communications, STEP 306. For instance, the trusted component intercepts requests to the security module, and validates, using the confidential binding attribute, the invalid objects of the requests containing secure keys (referred to herein as secure key objects) prior to forwarding the requests to the security module, STEP 308, as described further with reference to FIG. 4. Additionally, the trusted component intercepts results of a request processed by the security module and invalidates, using the confidential binding attribute, the objects of the results containing secure keys (referred to herein as secure key objects) returned to the secure guest, STEP 310, as described further with reference to FIG. 5.

Referring to FIG. 4, in one example, a secure guest submits a request (also referred to as a security module communication) to a security module (e.g., hardware security module 150), STEP 400. The request, which is a cryptographic request, such as, for instance, a request to encrypt or decrypt data, text, etc.; generate a key; etc., includes, for instance, one or more invalid objects that include one or more invalid secure keys. The request is intercepted by a trusted component (e.g., trusted firmware 160), STEP 402, and the trusted component searches the request for an object that includes a secure key, STEP 404. If an object is found that includes a secure key, INQUIRY 406, then at least part of the object specified to contain the integrity data is decrypted using a key of or derived from the confidential binding attribute (e.g., a key obtained from the confidential binding attribute), STEP 408. Processing then continues to STEP 404. However, if no object or no further object is found, INQUIRY 406, then the resulting request is forwarded to the hardware security module, STEP 410. The resulting request, which may be referred to herein as a cryptographic result, includes, for instance, one or more valid secure objects, assuming a key object is found at INQUIRY 406, that are bound to the security module (e.g., HSM 150) associated with the confidential binding attribute.

Referring to FIG. 5, in one example, a security module (e.g., hardware security module 150) returns a result of a request, STEP 500. The request is again, for instance, a cryptographic request. The returning of the result is intercepted by a trusted component (e.g., trusted firmware 160), STEP 502, and the trusted component searches the result for an object that includes a secure key, STEP 504. If an object is found that includes a secure key, INQUIRY 506, then at least part of the object specified to contain the integrity data (e.g., the message authentication code) is encrypted using a key of or derived from the confidential binding attribute (e.g., a key obtained from the confidential binding attribute), STEP 508. Processing then continues to STEP 504. However, if no object or no further object that contains a secure key is found, INQUIRY 506, then the possibly modified result is forwarded to the secure guest, STEP 510. The result, which may be referred to herein as a cryptographic result, includes, for instance, one or more invalidated secure objects, assuming a key object is found at INQUIRY 506, that are bound to the security module (e.g., HSM 150) associated with the confidential binding attribute.

Described herein is a capability to bind secure objects (e.g., that include secure keys) of a security module to a secure guest. In one or more aspects, a hardware security module is configured to a secure guest such that if the hardware security module is configured to another guest using a different confidential binding attribute no key material and/or other data taken from the secure guest can enable the other guest to use the taken keys with the configured hardware security module. In one or more aspects, the trusted firmware (a.k.a., Ultravisor (UV)) enforces that secure guests are configured to (e.g., only) access the hardware security module in hypervisor-passthrough mode. The metadata that is used to start (boot) the secure guest contains a confidential binding attribute (e.g., secret, such as a key/or material to derive a key) for each hardware security module to be configured to the secure guest. The metadata is integrity protected and cryptographically bound to the boot image of the secure guest and it is securely (i.e., confidentially and integrity protected) passed to the trusted firmware. The trusted firmware intercepts each request to the hardware security module from the secure guest. Using the confidential binding attribute, it invalidates each object containing a secure key to be returned to the secure guest. Using the confidential binding attribute, it validates each invalidated object in a request sent by the secure guest to the hardware security module before forwarding the request to the hardware security module.

As described herein, secure objects include, for instance, hardware security module protected keys, like keys wrapped by a master key stored securely in the hardware security module or any object (like an intermediate computation state) containing a hardware security module protected key. Such secure objects include, for instance, different (possibly overlapping parts), including, for instance, the actual secret that can only be uncovered by the hardware security module (e.g., the wrapped key), some additional information (like attributes of the object) that are interpretable by the software using the hardware security module, and some integrity protection data ensuring that the additional information is not separated from the secure object (secure data and the integrity data may overlap).

For the invalidation and validation to occur on secure objects of a secure guest, the hypervisor is not to be able to interfere with any request from the secure guest to the security module (e.g., hardware security module). Therefore, the hardware security modules configured to a secure guest are to be configured in hypervisor-passthrough mode, i.e. the hypervisor does not intercept any requests of the secure guest to the hardware security module.

The trusted firmware intercepts, for instance, each request of the secure guest to the hardware security module. For each request sent to the hardware security module, the trusted firmware intercepts the request and for each secure object in the request that includes a secure key object, corrupted integrity protection data is replaced with data containing a fixed integrity protection before forwarding the request to the hardware security module.

The data containing the fixed integrity protection is derived from the data containing the corrupted integrity protection by decrypting the data containing the corrupted integrity protection using a key of or derived from the hardware security module confidential binding attribute.

In one example, for each response returned by the hardware security module, the trusted firmware intercepts the response and for each secure object in the response that includes a secure key object, the data containing the integrity protection is replaced by data containing corrupted integrity protection before forwarding the response to the secure guest.

The data containing the corrupted integrity protection is derived from the data containing the integrity protection by encrypting the data containing the integrity protection using a key of or derived from the hardware security module confidential binding attribute.

Various aspects are described herein. Many variations and embodiments are possible without departing from a spirit of aspects of the present invention. It should be noted that, unless otherwise inconsistent, each aspect or feature described herein, and variants thereof, may be combinable with any other aspect or feature.

In one or more aspects, enclaves or similar technology are not required. Further, it is not required that hardware security modules be capable of establishing an end-point of a secure channel (based on asymmetric cryptography). Special hardware security modules, a key manager or a key distribution service are also not required. Further, in order to bind secure keys of a security module to a secure guest, the trusted firmware needs not keep track of any sessions opened to the security module nor the set of keys created by the security module.

One or more aspects of the present invention are inextricably tied to computer technology and facilitate processing within a computer, improving performance thereof. Embodiments of the present invention are inextricably tied to computing at least because they are directed to addressing an issue that is unique to computing and providing a technical approach that is also within this sphere. Embodiments of the present invention bind a secure object (e.g., including a secure key) of a security module (e.g., a hardware security module) to a specific guest (e.g., VM) belonging to a particular owner. The issue illustrated in FIG. 2, which aspects of some embodiments of the present invention serve to address, is specific to computing (i.e., an unauthorized guest gaining access to a secure wrapped key of an authorized guest). Given that both the issue and the approach are specific to computing, embodiments of the present invention are inextricably tied to computing.

Figure 6A:
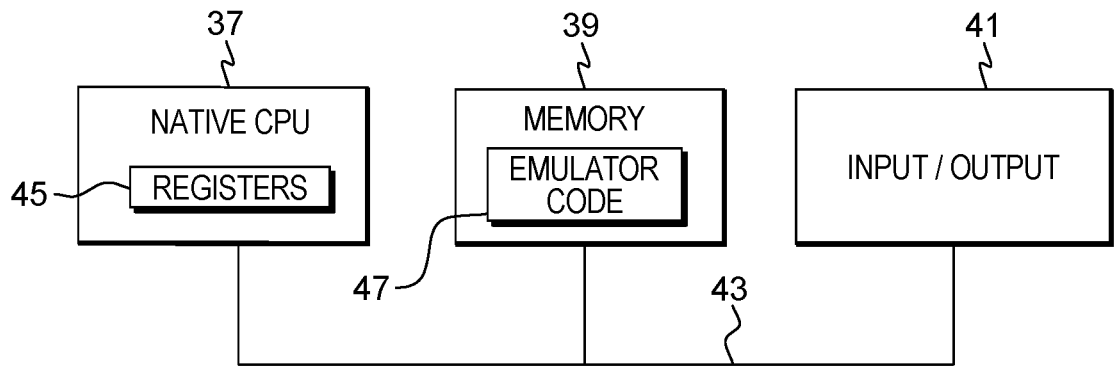
FIG. 6A depicts another example of a computing environment to incorporate and use one or more aspects of the present invention.

Other types of computing environments may also incorporate and use one or more aspects of the present invention, including, but not limited to, emulation environments, an example of which is described with reference to FIG. 6A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 6B:
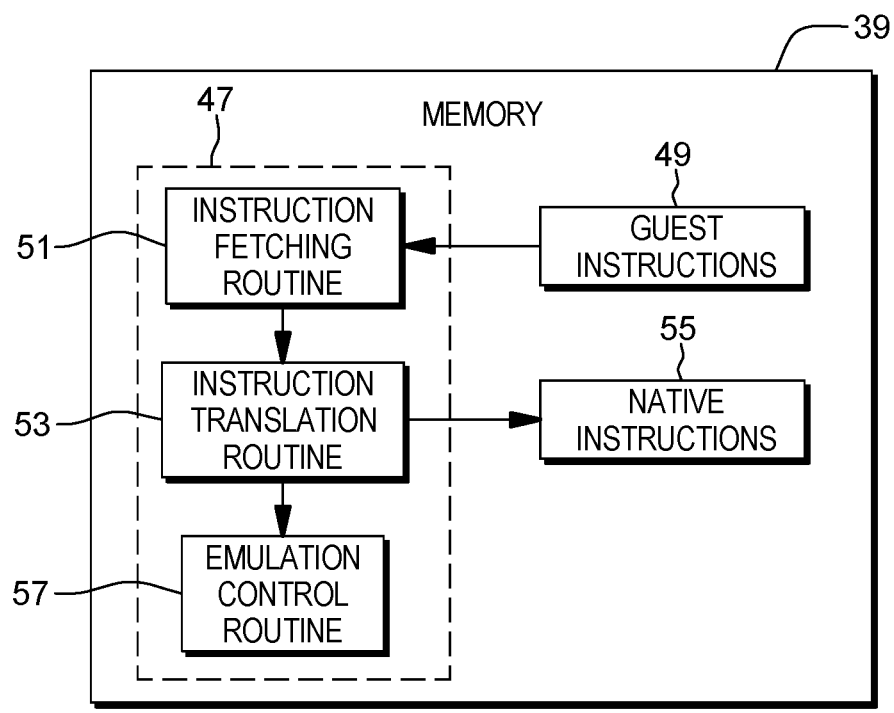
FIG. 6B depicts further details of the memory of FIG. 6A.

Further details relating to emulator code 47 are described with reference to FIG. 6B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 47 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
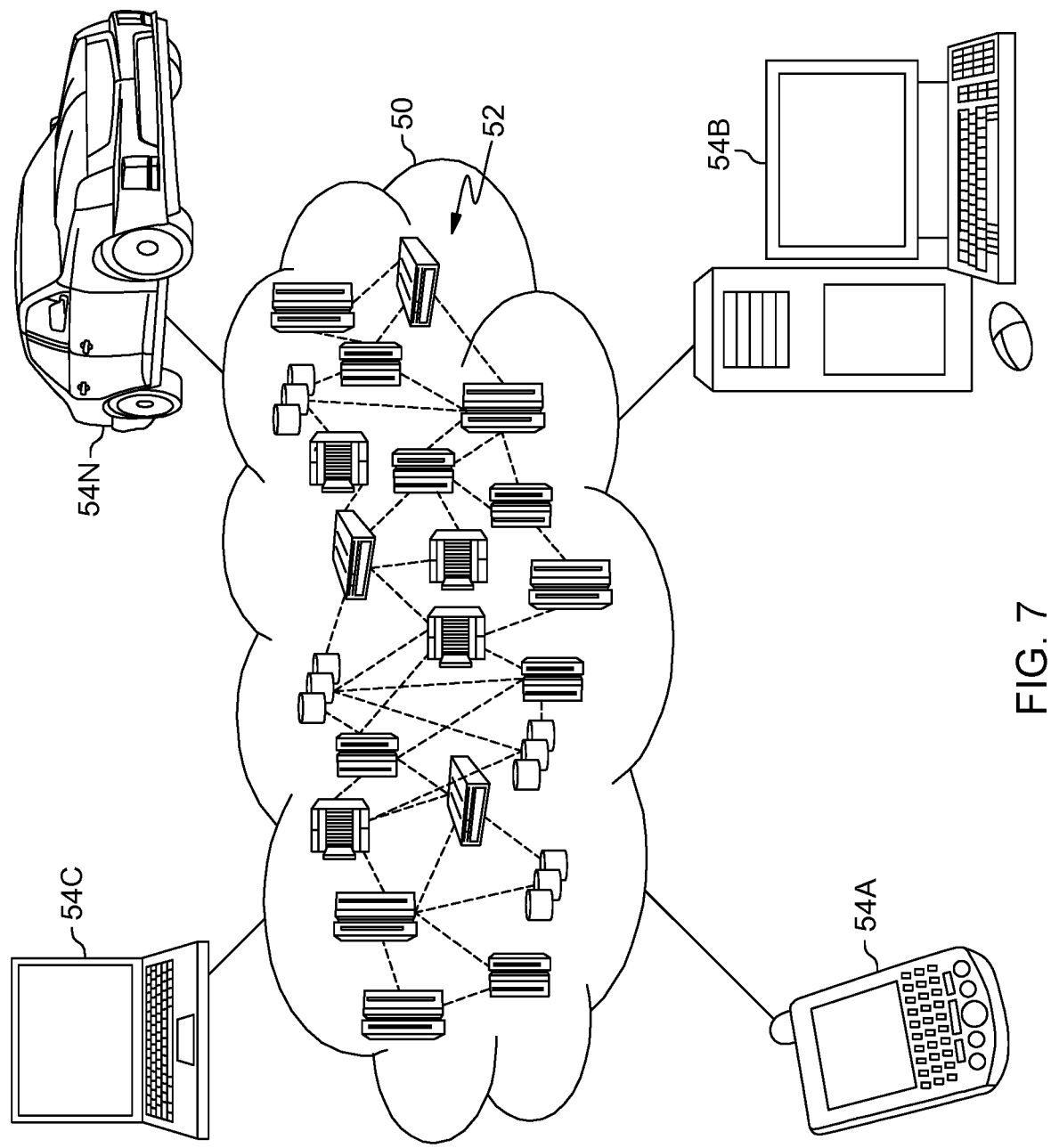
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
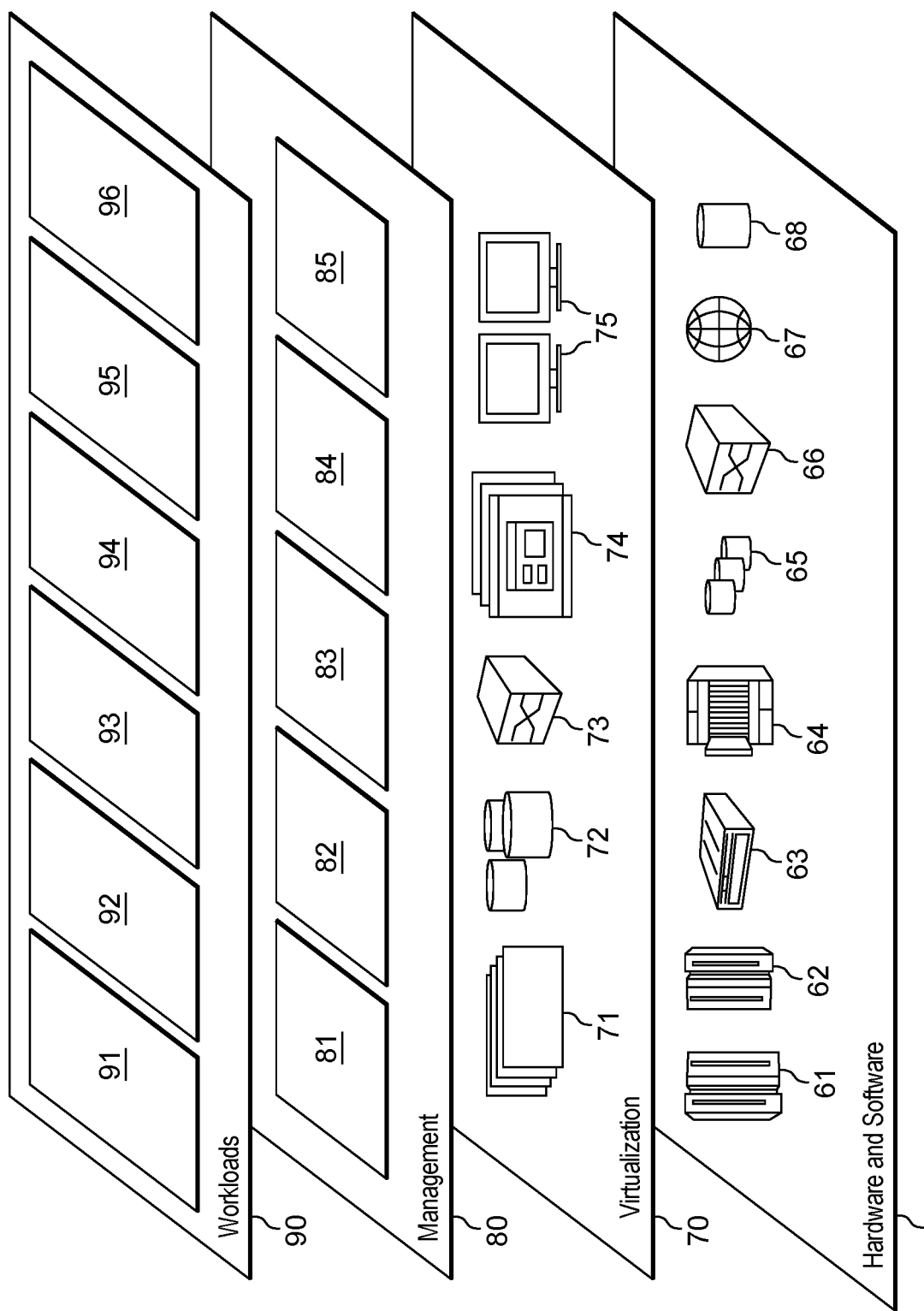
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure object binding processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other trusted components and/or security modules may be used. Additionally, the confidential binding attribute may be tied or linked to the guest through a mechanism other than the metadata, and/or the confidential binding attribute may be information/data other than a key or material to derive a key. Yet further, the select mode may be other than a hypervisor pass-through mode. In a further embodiment, the secure objects may be invalidated/validated other than by performing a cryptographic operation and/or other than by performing a cryptographic operation using the confidential binding attribute. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium readable by at least one processing circuit and storing instructions for performing a method comprising:
        binding at least one secure object of a security module of the computing environment to a secure guest of the computing environment, the secure guest configured to use the security module, and wherein the binding comprises:
            determining, by a trusted component of the computing environment, whether metadata of the secure guest includes a confidential binding attribute for the security module, the confidential binding attribute to be used to bind the at least one secure object generated by the security module to the secure guest, the security module being separate from the trusted component and assigned to the secure guest using a hypervisor;
            configuring, by the trusted component based on determining that the metadata includes the confidential binding attribute, the security module for the secure guest in a select mode, the select mode preventing certain operations from being intercepted by the hypervisor associated with the secure guest;
            intercepting, by the trusted component, a security module communication;
            performing a cryptographic operation on one or more secure objects of the security module communication using the confidential binding attribute to provide a cryptographic result; and
            providing an outcome of the security module communication to a receiver, the outcome including the cryptographic result.

2. The computer program product of claim 1, wherein the security module communication is a request from the secure guest to the security module, the cryptographic operation comprises a decryption operation to decrypt at least part of a secure object of the one or more secure objects of the request, and wherein the receiver is the security module.

3. The computer program product of claim 2, wherein the decryption operation comprises decrypting data within the secure object that includes an encrypted integrity protection, the decrypting using a key obtained from the confidential binding attribute.

4. The computer program product of claim 1, wherein the security module communication comprises results of a request that are returned by the security module based on processing the request, the cryptographic operation comprises an encryption operation to encrypt at least part of a secure object of the one or more secure objects of the results, and wherein the receiver is the secure guest.

5. The computer program product of claim 4, wherein the encryption operation comprises encrypting data within the secure object that includes an integrity protection computed using a select key of the security module to invalidate the secure object, the encrypting using a key obtained from the confidential binding attribute.

6. The computer program product of claim 5, wherein the method further comprises obtaining a request from the secure guest that includes one or more invalidated objects, and wherein the cryptographic operation comprises decrypting data within the one or more invalidated objects to validate the one or more invalidated objects, the decrypting using the key obtained from the confidential binding attribute.

7. The computer program product of claim 1, wherein the security module comprises a hardware security module.

8. The computer program product of claim 1, wherein the select mode is a hypervisor pass-through mode.

9. The computer program product of claim 1, wherein the trusted component prevents the hypervisor from changing a set of security modules configured to the secure guest.

10. The computer program product of claim 1, wherein the confidential binding attribute comprises a key.

11. The computer program product of claim 1, wherein the one or more secure objects include at least one or more secure keys.

12. The computer program product of claim 1, wherein the method further comprises preventing, by the trusted component, configuration of the security module to the secure guest, based on determining that the metadata of the secure guest does not include the confidential binding attribute.

13. The computer program product of claim 1, wherein the confidential binding attribute comprises material to derive the key.

14. A computer system for facilitating processing within a computing environment, the computer system comprising:
 a memory; and
 a processor in communication with the memory, wherein the computer system is configured to perform a method, said method comprising:
  binding at least one secure object of a security module of the computing environment to a secure guest of the computing environment, the secure guest configured to use the security module, and wherein the binding comprises:
   determining, by a trusted component of the computing environment, whether metadata of the secure guest includes a confidential binding attribute for the security module, the confidential binding attribute to be used to bind the at least one secure object generated by the security module to the secure guest, the security module being separate from the trusted component and assigned to the secure guest using a hypervisor;
   configuring, by the trusted component based on determining that the metadata includes the confidential binding attribute, the security module for the secure guest in a select mode, the select mode preventing certain operations from being intercepted by the hypervisor associated with the secure guest;
   intercepting, by the trusted component, a security module communication;
   performing a cryptographic operation on one or more secure objects of the security module communication using the confidential binding attribute to provide a cryptographic result; and
   providing an outcome of the security module communication to a receiver, the outcome including the cryptographic result.

15. The computer system of claim 14, wherein the security module communication is a request from the secure guest to the security module, the cryptographic operation comprises a decryption operation to decrypt at least part of a secure object of the one or more secure objects of the request, and wherein the receiver is the security module.

16. The computer system of claim 15, wherein the decryption operation comprises decrypting data within the secure object that includes an encrypted integrity protection, the decrypting using a key obtained from the confidential binding attribute.

17. The computer system of claim 14, wherein the security module communication comprises results of a request that are returned by the security module based on processing the request, the cryptographic operation comprises an encryption operation to encrypt at least part of a secure object of the one or more secure objects of the results, and wherein the receiver is the secure guest.

18. The computer system of claim 17, wherein the encryption operation comprises encrypting data within the secure object that includes an integrity protection computed using a select key of the security module to invalidate the secure object, the encrypting using a key obtained from the confidential binding attribute.

19. The computer system of claim 14, wherein the method further comprises preventing, by the trusted component, configuration of the security module to the secure guest, based on determining that the metadata of the secure guest does not include the confidential binding attribute.

20. A computer-implemented method of facilitating processing within a computing environment, the computer-implemented method comprising:
 binding at least one secure object of a security module of the computing environment to a secure guest of the computing environment, the secure guest configured to use the security module, and wherein the binding comprises:
  determining, by a trusted component of the computing environment, whether metadata of the secure guest includes a confidential binding attribute for the security module, the confidential binding attribute to be used to bind the at least one secure object generated by the security module to the secure guest, the security module being separate from the trusted component and assigned to the secure guest using a hypervisor;
  configuring, by the trusted component based on determining that the metadata includes the confidential binding attribute, the security module for the secure guest in a select mode, the select mode preventing certain operations from being intercepted by the hypervisor associated with the secure guest;
  intercepting, by the trusted component, a security module communication;
  performing a cryptographic operation on one or more secure objects of the security module communication using the confidential binding attribute to provide a cryptographic result; and
  providing an outcome of the security module communication to a receiver, the outcome including the cryptographic result.

21. The computer-implemented method of claim 20, wherein the security module communication is a request from the secure guest to the security module, the cryptographic operation comprises a decryption operation to decrypt at least part of a secure object of the one or more secure objects of the request, and wherein the receiver is the security module.

22. The computer-implemented method of claim 20, wherein the security module communication comprises results of a request that are returned by the security module based on processing the request, the cryptographic operation comprises an encryption operation to encrypt at least part of a secure object of the one or more secure objects of the results, and wherein the receiver is the secure guest.

23. The computer-implemented method of claim 22, wherein the encryption operation comprises encrypting data within the secure object that includes an integrity protection computed using a select key of the security module to invalidate the secure object, the encrypting using a key obtained from the confidential binding attribute.

24. The computer-implemented method of claim 20, wherein the select mode is a hypervisor pass-through mode.

25. The computer-implemented method of claim 20, wherein the method further comprises preventing, by the trusted component, configuration of the security module to the secure guest, based on determining that the metadata of the secure guest does not include the confidential binding attribute.

* * * * *